(12) United States Patent
Konstantinides et al.

(10) Patent No.: US 12,248,924 B2
(45) Date of Patent: *Mar. 11, 2025

(54) SYSTEM AND METHOD FOR MOBILE PAYMENTS

(71) Applicant: Charles Schwab & Co., Inc., San Francisco, CA (US)

(72) Inventors: Konstantinos P. Konstantinides, Martinez, CA (US); Naresh Sikha, San Francisco, CA (US); Janardhan D. Kakarla, Dublin, CA (US); Eliel R. Johnson, San Francisco, CA (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,772

(22) Filed: Sep. 27, 2023

(65) Prior Publication Data

US 2024/0020675 A1 Jan. 18, 2024

Related U.S. Application Data

(63) Continuation of application No. 13/770,160, filed on Feb. 19, 2013, now Pat. No. 11,810,095.

(60) Provisional application No. 61/600,675, filed on Feb. 19, 2012.

(51) Int. Cl.
*G06Q 20/32* (2012.01)
*G06Q 20/04* (2012.01)
*G06K 7/00* (2006.01)

(52) U.S. Cl.
CPC ............ *G06Q 20/32* (2013.01); *G06Q 20/04* (2013.01); *G06K 7/00* (2013.01)

(58) Field of Classification Search
CPC ...... G06Q 20/32; G06Q 20/04; G06Q 20/102; G06Q 20/227; G06Q 20/322; G06Q 20/3224; G06Q 20/3265; G06Q 20/326; G06Q 20/3276; G06Q 20/401; G06K 7/00
See application file for complete search history.

(56) References Cited

U.S. PATENT DOCUMENTS

| | | | |
|---|---|---|---|
| 5,600,565 | A | 2/1997 | Wagner et al. |
| 6,208,973 | B1 | 3/2001 | Boyer et al. |
| 6,311,170 | B1 | 10/2001 | Embrey |
| 7,637,436 | B1 | 12/2009 | Anderson |
| 7,970,661 | B1 | 6/2011 | Abraham et al. |

(Continued)

FOREIGN PATENT DOCUMENTS

| | | | | |
|---|---|---|---|---|
| EP | 2549421 A1 | * | 1/2013 | ............ G06Q 20/10 |
| JP | H081-38091 A | | 5/1996 | |

(Continued)

OTHER PUBLICATIONS

Armstrong, Mario: Scan QR Code and make payment with Mobio App, Dec. 29, 2010, p. 1 (Year: 2010).*

(Continued)

*Primary Examiner* — Bijendra K Shrestha
(74) *Attorney, Agent, or Firm* — Harness, Dickey & Pierce, P.L.C.

(57) ABSTRACT

A system and method allows a user to pay for a transaction by scanning an encoded image, for example, using a mobile device. The payor is anonymous to the party receiving payment.

21 Claims, 5 Drawing Sheets

(56) References Cited

U.S. PATENT DOCUMENTS

| | | | |
|---|---|---|---|
| 8,094,870 B2* | 1/2012 | Crookham | G06V 30/18143 382/100 |
| 8,412,626 B2 | 4/2013 | Hirson et al. | |
| 8,423,457 B1* | 4/2013 | Schattauer | G06Q 20/387 705/16 |
| 8,774,781 B1* | 7/2014 | Speiser | G06Q 20/326 455/414.3 |
| 9,836,780 B2* | 12/2017 | Cooke | G06Q 30/0641 |
| 2003/0200118 A1 | 10/2003 | Lee et al. | |
| 2005/0102242 A1* | 5/2005 | Omidyar | G06Q 20/10 705/65 |
| 2005/0125301 A1 | 6/2005 | Muni | |
| 2006/0229984 A1* | 10/2006 | Miyuki | G07G 1/12 705/40 |
| 2008/0086420 A1 | 4/2008 | Gilder et al. | |
| 2009/0106154 A1 | 4/2009 | Reynolds et al. | |
| 2010/0106643 A1* | 4/2010 | Adiseshann | G06Q 20/3223 705/42 |
| 2010/0142704 A1* | 6/2010 | Camenisch | H04L 9/3013 380/28 |
| 2011/0208600 A1* | 8/2011 | Aharoni | G06Q 20/3274 705/16 |
| 2012/0036028 A1* | 2/2012 | Webb | G06Q 50/12 705/15 |
| 2012/0136796 A1 | 5/2012 | Hammad et al. | |
| 2012/0166332 A1* | 6/2012 | Naaman | G06Q 20/3278 705/40 |
| 2012/0173350 A1* | 7/2012 | Robson | G06Q 30/0643 705/16 |
| 2012/0290480 A1* | 11/2012 | Chen | G06Q 20/385 705/44 |
| 2013/0085931 A1* | 4/2013 | Runyan | G06Q 20/325 705/40 |
| 2020/0106643 A1 | 4/2020 | Tseng | |

FOREIGN PATENT DOCUMENTS

| | | | | |
|---|---|---|---|---|
| JP | H0-8138091 | * | 5/1996 | G07B 13/00 |
| JP | 4218299 B2 | * | 2/2009 | G06Q 30/06 |
| KR | 100650256 B1 | * | 11/2006 | G06Q 20/00 |
| WO | WO-2013142917 A1 | * | 10/2013 | G06K 19/06056 |

OTHER PUBLICATIONS

Armstrong, Mario: Scan QR Code and make Payments with Mobio App, Dec. 29, 2010, pp. 1-2 (Year: 2010).*

Medicare Learning Network: Acute Inpatient Propective Payment System, Payment System Fact Sheet Series, Jan. 2009, pp. 1-6. (Year: 2009).*

Retail Geek: Best Buy Deploys QR Codes to Enhance Shopping Experience, Sep. 15, 2010, pp. 1-22 (Year: 2010).*

* cited by examiner

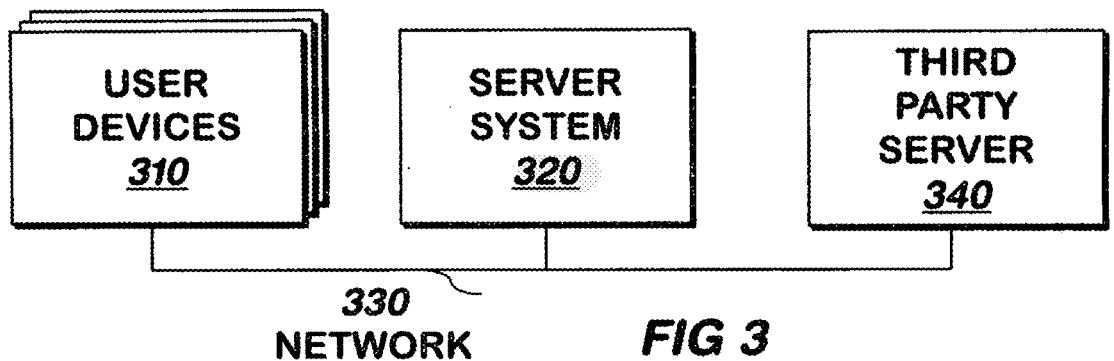
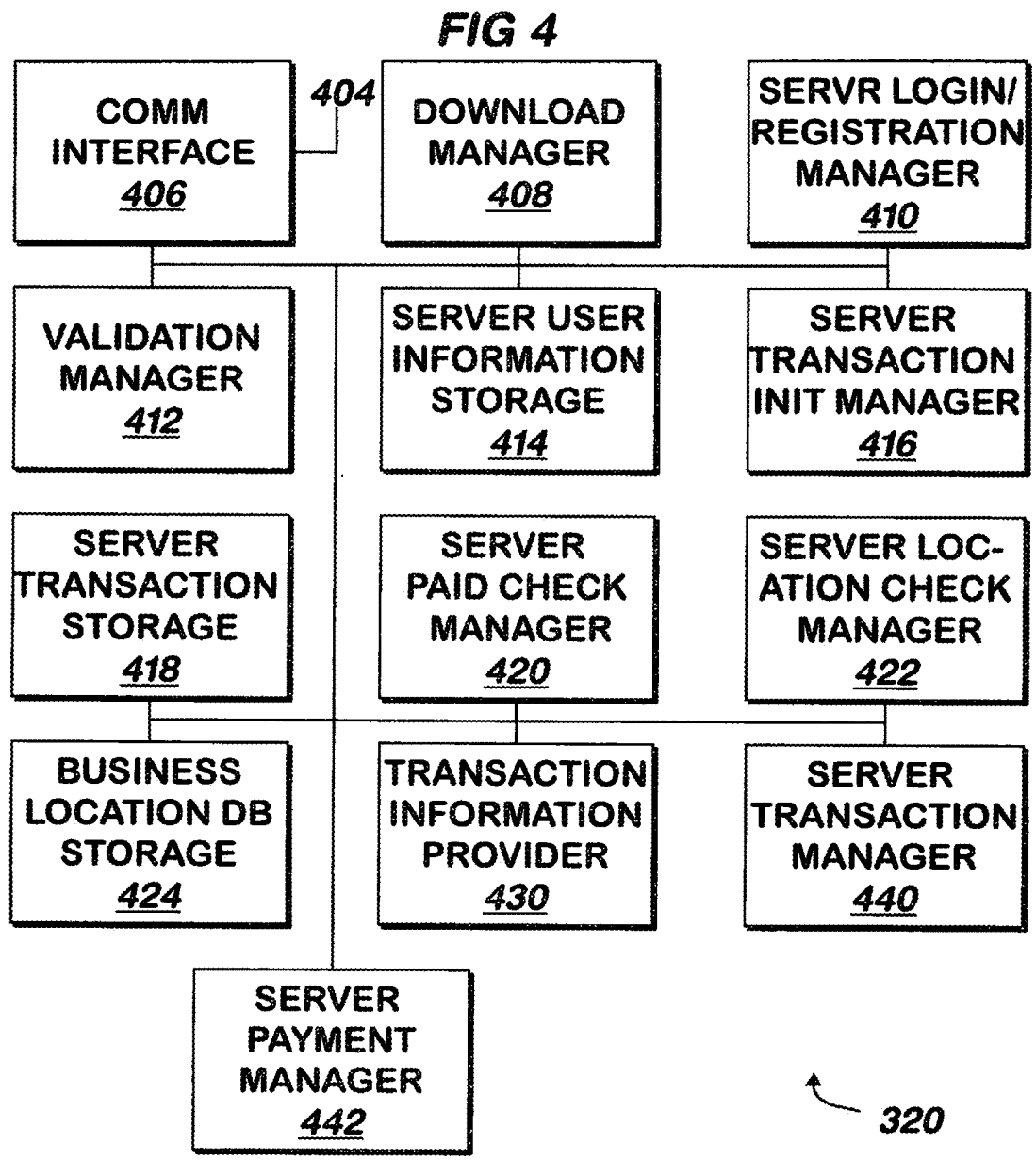

SYSTEM AND METHOD FOR MOBILE PAYMENTS

CROSS-REFERENCE TO RELATED APPLICATIONS

This application is a Continuation of U.S. application Ser. No. 13/770,160, filed on Feb. 19, 2013, which claims priority under 35 U.S.C. § 120 to U.S. Provisional Application No. 61/600,675, filed Feb. 19, 2012, the entire contents of each of which are hereby incorporated by reference.

FIELD OF THE INVENTION

The present invention is related to computer software and more specifically to computer software for mobile payments.

BACKGROUND OF THE INVENTION

Cash is inconvenient and subject to theft. Credit cards are more convenient, but people don't always have access to credit, and specialized equipment can be required to process credit card transactions. What is needed is a system and method that can allow users to pay other parties with no specialized equipment.

SUMMARY OF INVENTION

A system and method allows a user to make a payment via mobile device. The system and method allows a user to download a mobile application onto their mobile device and install the mobile application using conventional methods. The system and method then receives information from the user via the mobile application, such as whether the user will be a payor, payee or both, which account at a financial institution should be used to pay, which account at a financial institution should be used to receive payments, and a password, and the system and method issues to the application an alternate user identifier and stores the alternate user identifier in the application, and all of the information received is stored on a server, along with the alternate user identifier. The account or accounts specified by the user are validated using conventional techniques. In one embodiment, the user supplies a business name and address, and the business name and address may be validated against a conventional business locations database, and if the user's information is validated in this manner an indication is stored associated with the user's account.

To allow payments to be made, the user may log into the server or into the mobile application, and make a request to generate a coded image that corresponds to transaction information that includes a transaction identifier and an amount, and may include other information as well. The user may specify the amount, whether or not the image may be used only one time or may be used more than one time, whether the payor may specify an extra amount such as a tip, whether the transaction may be split among multiple payors, information to be provided to the payor after the payor scans the image, as well as information to be provided to the payee when the transaction has been paid. A transaction identifier is generated and stored associated with the transaction information described above.

An image is generated on the server and provided to the device, the image encoding the amount and the transaction identifier. In one embodiment, the image may be generated elsewhere, such as on the device, or on a third-party device such as a third-party server. If the image is generated on the device, the transaction identifier may be provided by the server to the device. If the image is generated on a third-party server, a block of transaction identifiers may be issued to the third-party server, and the third-party server may generate the image and provide to the server the transaction identifier, amount and other information corresponding to the image generated.

The image may be displayed on any article, including the device of the payee, a point-of-sale terminal, a billboard, or any other article. At any time, a different user may log in from their mobile device to the application and the server authenticates the user. The user may then scan the encoded image displayed as described above. The device decodes the image and sends the transaction identifier and an encoded version of the alternate identifier associated with the device to the server. Alternatively, the device may send the encoded image to the server and the server decodes the information in the image. The server may determine whether the transaction identifier corresponds to a transaction that has been designated as a one time use transaction identifier as described above, whether the transaction has been paid, and may check the location of the device from which the encoded image or information from the encoded image was received and the business locations database.

If the transaction is designated as a one-time transaction and that transaction has been paid, the user of the device from which the image or the transaction identifier was received is notified and no payment may be processed for such transactions. Otherwise, if the location of the device is at or near the location specified by the payee, and the name of the company and the location specified by the payee still corresponds to the business locations database, the method continues as described below, and otherwise, the server notifies the user of the device from which the encoded image, or information therefrom, was received to ensure that the payee is the payee intended by the user of such device, referred to as the payor.

The server may send, and the application may receive and display, the amount, the payor information supplied by the payee, and the name of the payee. In one embodiment, such information is encoded in the image, and therefore is not requested from the server by the application in order to display it.

The server may send, and the application may receive, indications as to whether an extra amount of payment to be specified by the payor may be added to the payment, and whether multiple payors are allowed. Such information may also be encoded in the image, and therefore need not be received from the server by the application.

If multiple payors are allowed, the application displays to the user a user interface for receiving either the amount to be paid by that user or the percentage of the amount specified by the payee to be paid by that payor, and such information may be received by the application.

If an extra amount is allowed, the application displays a user interface for, and receives from the paying user, any extra amount. The application totals the amount to be paid and any extra amount, displays the total and a confirmation button, and receives confirmation via the button from the user. If multiple financial accounts are registered to the payor, the user may also specify one or more accounts to use to pay for the transaction. The application sends the transaction identifier, the total amount paid, any extra amount paid by the user, and the alternate user identifier associated with the application, and optionally, an indication of the account or accounts specified by the user. The server attempts to charge any such payor accounts and listens for confirmation, and indicates to the parties whether the payor account was successfully charged. If so, the payor account or accounts are charged the total amount and the payee is credited the total amount less a fee charged by the party managing or operating the server.

In the case of multiple payors, after one payment has been received but prior to all payments they received, the percentage of the transaction paid and/or unpaid may be displayed to the payee and any payor for that transaction. Once the transaction has been fully paid, the transaction may be marked by the server as having been paid, and recorded with the date and time of payment.

BRIEF DESCRIPTION OF THE DRAWINGS

FIG. 3 is a block schematic diagram of a system for using encoded images to provide and receive payments according to one embodiment of the present invention.

FIG. 4 is a block schematic diagram of server system 320 of FIG. 3 shown in more detail according to one embodiment of the present invention.

DETAILED DESCRIPTION OF A PREFERRED EMBODIMENT

Figure 1:
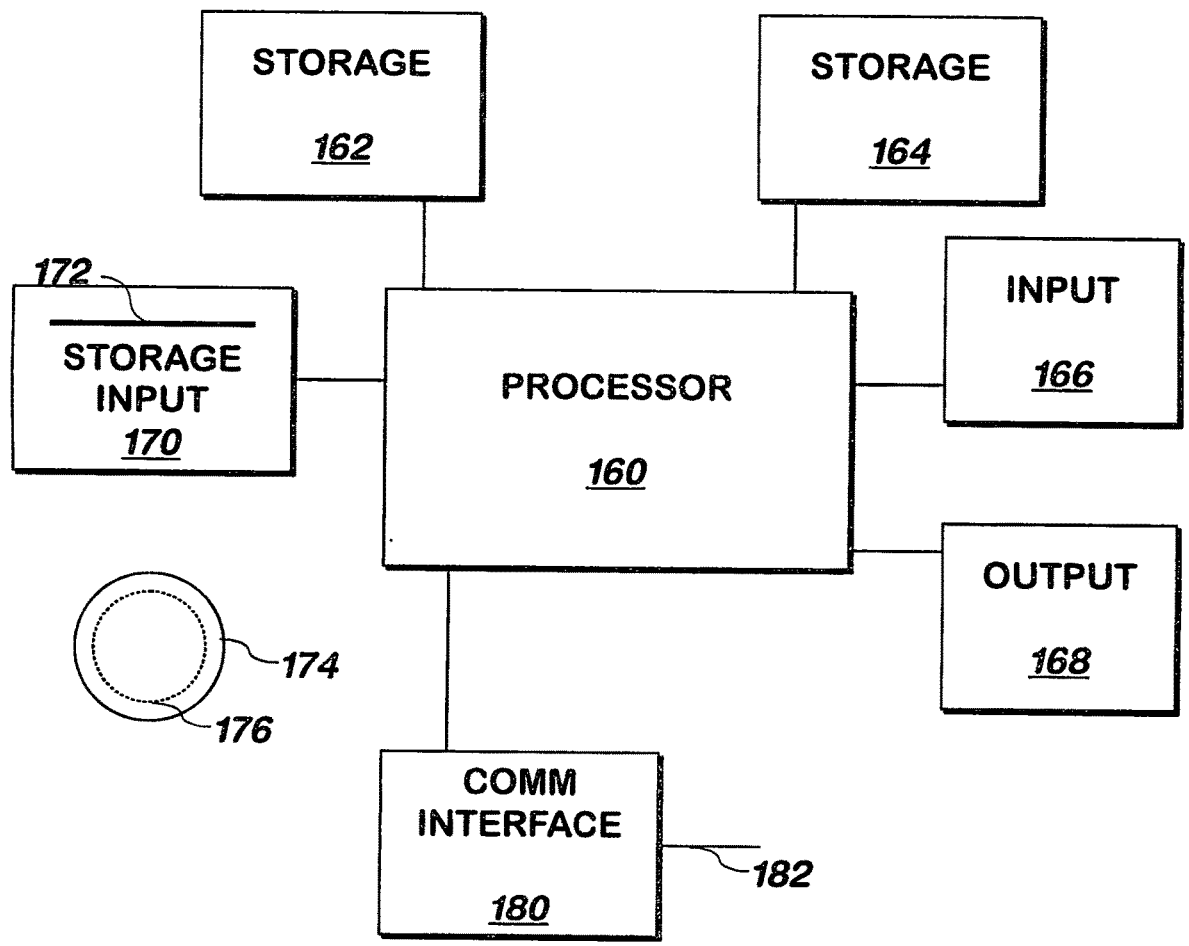
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as XP, VISTA, or 7) commercially available from MICROSOFT Corporation of Redmond Washington or a Macintosh computer system running the MACOS or OPENSTEP operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a DROID 2 mobile telephone commercially available from MOTOROLA CORPORATION of Schaumberg, Illinois running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2A:
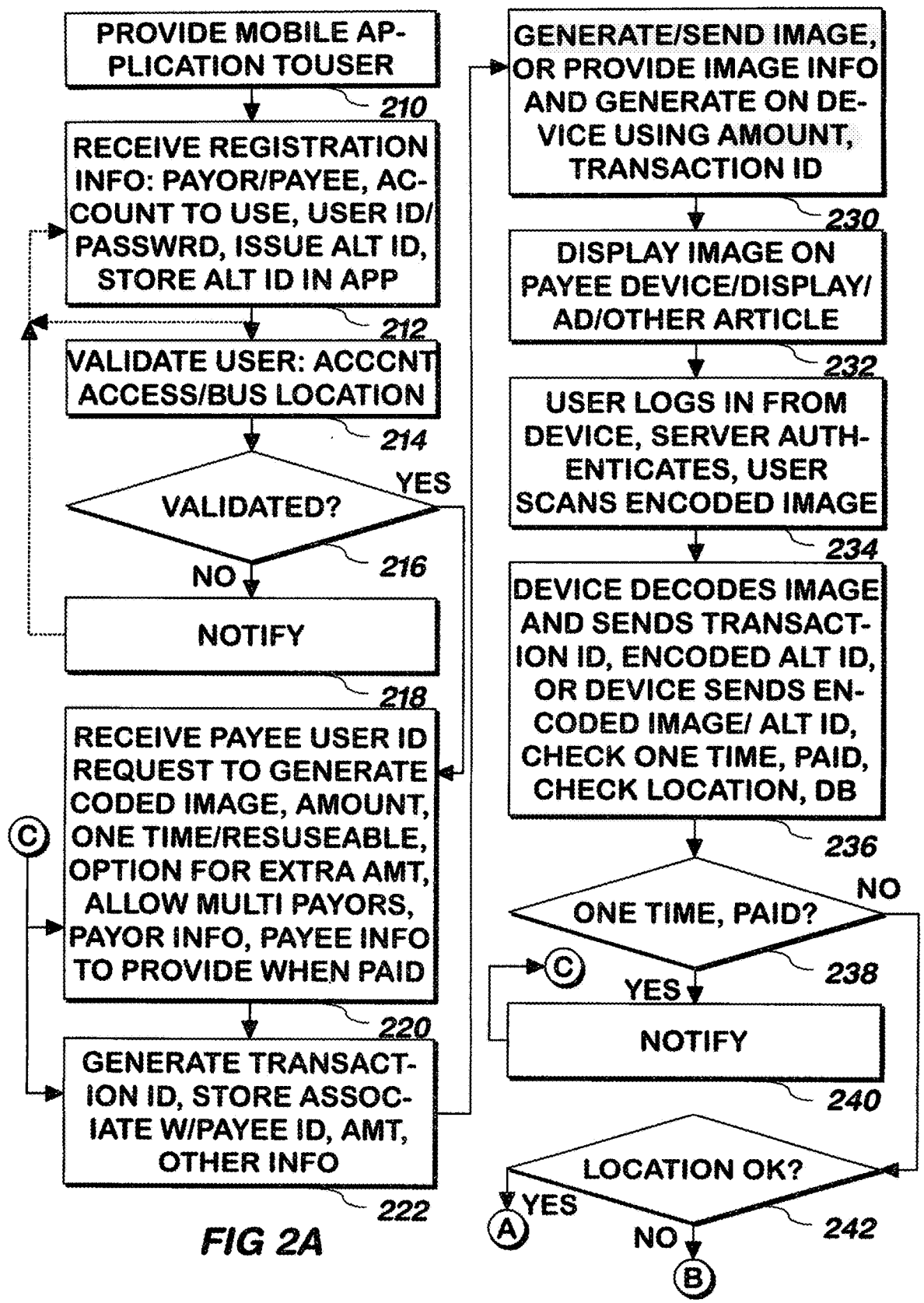
FIG. 2, consisting of FIGS. 2A, 2B, is a flowchart illustrating a method of processing payments from mobile devices according to one embodiment of the present invention.
Figure 2B:
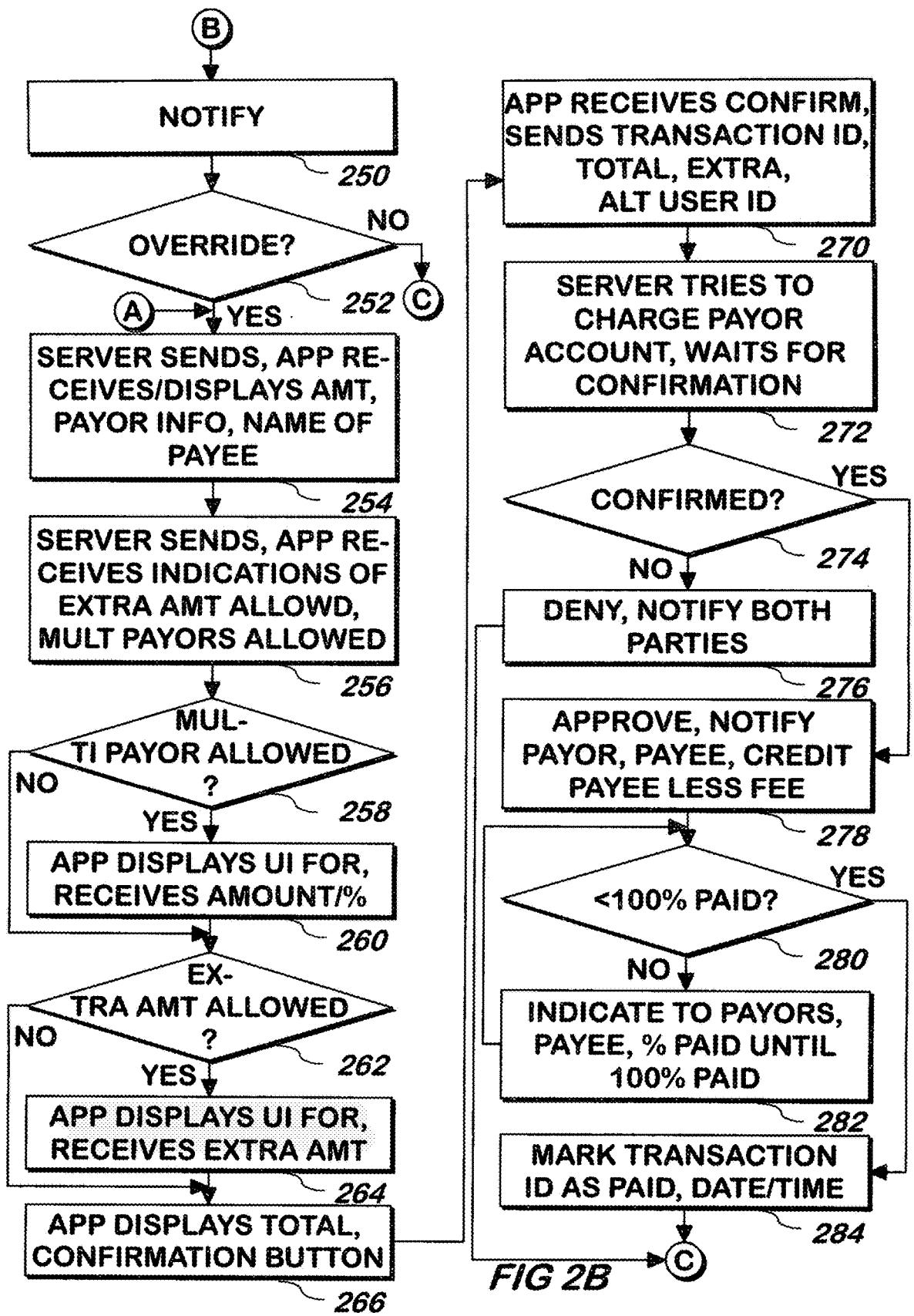

FIG. 2, consisting of FIGS. 2A and 2B, is a flowchart illustrating a method of using encoded images to provide and receive payments according to one embodiment of the present invention.

Provide Mobile Application to User.

Referring now to FIG. 2, one or more mobile applications are provided to a user 210. In one embodiment, the mobile application may be provided to the user on a wireless communication device, such as the user's cell phone, and the user may download the mobile application to the user's device in any conventional manner. The mobile application may be provided to, and downloaded by, any number of users on any number of devices at any time.

Receive Registration Information Including Payor/Payee, Financial Account to Link, User Identifier and Password; Issue Alternate User Identifier and Store Alternate User Identifier in Mobile Application.

Registration information corresponding to the mobile application, including whether the user is registering a payor account and/or a payee account, one or more financial accounts to link to the user's account(s) on the mobile application, an application user identifier and corresponding password, and any other registration information, may be received and stored at a server, and an alternate user identifier may be issued for the user and stored on the server associated with the other registration information and the alternate user identifier is stored by the user's mobile application 212.

In one embodiment, the user may register a payor account to make payments or transfer funds out of a linked financial account, or the user may register a payee account to accept payments or receive funds into a linked financial account, or the user may register both a payor account and a payee account or a single account may be used for both functions. Multiple of these accounts may be registered by a single user. Financial account information corresponding to one or more financial accounts to link to the user's account(s) on the mobile application may be received as a routing number and account number, such as if the financial account is a bank account, or it may be received as credit card information if the financial account is a credit account, or it may be received in any other manner. In one embodiment, the user may link a financial account to the user's payor account from which to charge or withdraw payments made by the user as described herein, and the user may also link the same financial account or a different financial account to the user's payee account into which to credit or deposit payments received by the user as described herein. Any registration information received from the user may be stored by the server associated with the user's application user identifier.

An alternate user identifier may be issued for the user and stored in association with the user's application user identifier by the server. The alternate user identifier may be stored on the mobile application, and the application user identifier may not be stored on the mobile application.

In one embodiment, registration information may be received from the user via a suitable user interface using the user's mobile device and mobile application, or via a registration web page using a system and/or device other than the user's mobile device, such as a personal computer. Registration information may be received from any number of users at any time through the process of receiving registration information, which may be an independently operating process as shown by the dashed lines in the Figure.

Validate User: Financial Account Access and Business Location.

An attempt may be made to validate the user's payee account, including attempted validation of the user's access to the linked financial account 214. The user's access to the linked financial account may be validated using any conventional account verification methods. For example, access to a linked bank account (e.g. received as a routing number and account number) may be verified by temporarily depositing and then withdrawing an amount or amounts of funds into the specified bank account, and requiring the user to subsequently verify the amount or amounts of the temporary deposits and/or withdrawals. If the user is registering a payee account, business information such as the name and address of the business may be received from the user and stored as a part of step 212. In one embodiment, step 214 includes validation of the user's business and/or its location if the user provides business information. To verify business information corresponding to the user's payee account, business information provided by the user, including the name and address of the user's business, may be checked against a database of businesses and/or business locations to verify that the received business information matches the database.

If Payee not Validated, then Notify.

If the user's payee account, including the user's bank account information and optional business information, is not validated 216, then the user may be notified 218 of such lack of verification, and the method may continue at step 214.

If Payee Validated, then Request to Generate Encoded Image May be Received.

Once the user's payee account is validated 216, then the user's payee user identifier may be received, along with a request to generate an encoded image that may be scanned by a payor user to allow funds from the bank account linked to the payor user to be transferred to the bank account linked to the payee user 220. In one embodiment, the request to generate the encoded image may include the requested fund amount to be transferred corresponding to the encoded image, an indication whether the encoded image is for one-time use or reusable, an indication whether the requested fund amount may be optionally modified or additional funds may be added to the requested fund amount to be transferred (e.g. charity donation or gratuity), an indication whether the requested transfer amount may be divided among multiple payor users (e.g. multiple diners splitting a bill at a restaurant), any display details to provide when the transaction is completed, and any other information to encode into the encoded image. In one embodiment, an encoded image generated for one-time use may expire once the fund amount is paid. An encoded image generated to be reusable may be used one or more times without expiring, such as an encoded image generated for the payment of rent.

In one embodiment, the user may wish to include payor and/or payee display details or additional information corresponding to the transaction to display when the requested transaction is complete as described below. For example, the user may provide a nickname or company name for the user's payee account or a payee transaction number corresponding to the transaction. In one embodiment, any information corresponding to the request to generate the encoded image may be received by the server.

Generate Transaction Identifier, Store Associated with Payee User Identifier and Transaction Amount.

A transaction identifier corresponding to the received request may be generated, and received request may be stored associated with the generated transaction identifier may be stored associated with the payee user identifier received with the request and the requested amount of funds to transfer 222.

Generate/Send Encoded Image, or Provide Image Information and Generate Encoded Image on Device.

The requested encoded image may be generated to contain the transaction identifier and specified amount of funds and any other information corresponding to the request encoded in the image 230. In one embodiment, the encoded image may be generated and sent to the specifying user's device or to a printer, or image information that may be used to generate the encoded image on the user's device may be provided to the device requesting it. In one embodiment, the encoded image may be generated at the server and sent to the party requesting the encoded image, or the encoded image may be generated by the user's device or by a third party server and the transaction identifier and other information may be sent to the server.

Display Encoded Image.

The generated encoded image may be displayed 232. The encoded image may displayed by any number of devices, such as the payee's mobile device and/or other payee devices, as well as by any other displays, including point-of-sale terminals, web pages, posters and/or flyers, advertisements, products or product labels, charity donation displays, or any other displays or types of displays.

User Logs in from Device, Server Authenticates, and User Scans an Encoded Image.

At step 234, at any time, the user may log in to the application, such as from the user's mobile device, the user may be authenticated to the server. In one embodiment, the user may log in to the application on the user's mobile device by providing the previously established application password via the user's registered mobile device. To authenticate the user to the server, the alternate user identifier stored on the user's mobile application may be encrypted along with the password provided by the user, and the encrypted alternate user identifier and password may be sent to the server, which decrypts the encrypted information. The received password may be checked against the password stored at the server for the alternate user identifier to authenticate the user and the user's device. As part of step 234, the user may scan an encoded image, such as any encoded image displayed using a payee account via the mobile application as described above.

Device Decodes Image and Sends Transaction Identifier and Encoded Alternate User Identifier, or Device Sends Encoded Image/Alternate User Identifier; Check One-Time, Paid; Check Location, Database.

When the user scans the encoded image using the mobile application, the image may be decoded by the mobile application, and decoded information including the transaction identifier decoded from the image may be sent to the server along with the user's encoded alternate user identifier, or the encoded image and encoded alternate user identifier may be sent from the user's device to the server to be decoded at the server 236.

Additionally at step 236, decoded information from the image and/or transaction information associated with the decoded transaction identifier at the server may be checked to determine whether the encoded image is for one-time use or reusable, whether the requested transaction associated with the encoded image has been previously completed, and whether the location of the device scanning the encoded image corresponds to the business location information corresponding to the payee account associated with the transaction identifier.

If One-Time Use and Paid, then Notify.

If the encoded image has been generated for one-time use and has already been paid 238, then the user scanning the encoded image may be notified 240 that the encoded image generated for one-time use has already been paid. The method may continue at step 220 or 222.

If not One-Time Use or One-Time Use and not Paid, and if Location is not Valid, then Notify.

If the encoded image has not been generated for one-time use (i.e. it is reusable), or if the encoded image has been generated for one-time use but the payment associated with the encoded image has not been paid 238, the method continues at step 242.

At step 242, if location information corresponding to the location (or last known previous location) of the device scanning the image is not at least near location information encoded in the image (e.g. registered business location of payee account) 242, then a location notification may be provided 250 to the user. In one embodiment, the location notification provided to the user may inform the user of such discrepancies in location information and may also include an option to ignore or override the notification and/or proceed with the transaction. In one embodiment, a location notification may also be provided to the payor user if business location information corresponding to the payee account encoded in the image has not been confirmed with the database of business locations, or if business location information has not been received and/or stored for the payee account, or is otherwise invalid.

If User does not Override Invalid Location.

If no indication is received from the user to override the location notification 252, such as if the user does not press an override button provided by the mobile application, then payment for the transaction may not proceed, and the method may continue at step 220.

If Location is Valid, or if User Overrides Invalid Location, then Server Sends and Application Receives/Displays Transaction Amount, Payor Information and Name Provided by Payee.

If the location information corresponding to the location of the device scanning the image matches location information encoded in the image 242, or if the user overrides the location notification 252, such as by pressing or selecting the override option provided with the location notification, then transaction information may be sent from the server to the application, including the requested amount of funds or payment associated with the transaction and any payee display information associated with the transaction 254.

In one embodiment, such transaction information may be encoded in the image and decoded by the application and communication with the server may not take place.

Server Sends and Application Receives Indications Whether Adding Additional Funds Allowed, Multiple Payors Allowed.

Other transaction information, including an indication of whether or not the payment amount may be paid using more than one payor account and an indication of whether or not additional funds may be added to the payment amount, may be sent from the server to the application 256 or it may be encoded in the image.

Application Optionally Displays User Interface for Payment Portion and Receives Payment Portion Information.

If multiple payors are allowed 258, then a suitable user interface may be displayed to allow the user to provide, and the application to receive, a designated portion of funds to pay using the user's payor account 260. In one embodiment, the amount still unpaid of the total payment owed may be displayed. The user may specify the portion of the total amount owed that the user would like to pay as a specific fund amount, such as a dollar amount, or as a percentage of the total payment originally specified. The user may choose to pay a portion of the total payment amount due, or the user may choose to pay all of the total payment amount due.

Application Optionally Displays User Interface for Adding Additional Funds and Receives Additional Funds Information.

When the portion of funds being paid by the user has been received from the user as part of step 260, or if splitting the payment between more than one payor accounts is not allowed 258, then the method continues at step 262. At step 262, if additional funds may be added to the payment amount, then a suitable user interface may be displayed to the user on the user's device to allow the user to provide the additional fund amount 264. For example, if the encoded image corresponds to a bill at a restaurant, one or more user interface elements, such as a text field and/or a list of selectable options, may be displayed to allow the user to provide an optional gratuity amount to include with the payment of the bill. In one embodiment, helpful additional funds information may be displayed to the user and/or included in the user interface, such as common tipping percentages and the amount of funds that correspond to such percentages in relation to the total payment or the user's payment. For example, if the encoded image corresponds to a restaurant bill that may be paid using multiple payor accounts, then the additional funds user interface may display information including the amounts of additional funds equal to a 10%, 15%, 20% or 25% tip in relation to the entire bill being paid, or in relation to only the amount or portion of the bill being paid by the selected user, or both. In one embodiment, such tip percentage calculations may be performed by the application on the user's device and displayed to the user along with the option of choosing a displayed suggestion, or entering an amount manually, or providing the additional amount of funds to include in any other manner.

Application Displays Total Payment Amount and Confirmation Button.

When the additional fund amount has been received as part of step 264, or if adding additional funds to the payment amount is not allowed 262, then the total amount of payment being made by the user may be displayed 266 along with a confirmation button. In one embodiment, the total payment being made by the user may include a base payment corresponding to requested fund transfer amount encoded in the image plus any additional funds optionally added by the user. Additionally, if multiple payors are allowed, the total amount owed corresponding to the image may be displayed, or the portion owed by the user from the total amount may be displayed, or both. Extra amounts specified by the users are not subtracted from the amount specified when computing the total amount or portion owed. The user may confirm the payment, such as by clicking or pressing the provided confirmation button.

Application Receives User Confirmation, Sends Transaction Identifier, Total Payment Amount, Alternate User Identifier.

When the payment is confirmed by the user, the application may send payment confirmation information, including the transaction identifier corresponding to the payment confirmation, the base amount of payment confirmed by the user, and any extra amount of payment confirmed by the user, to the server along with the alternate user identifier stored on the device confirming the payment 270. In one embodiment, the application may send the alternate user identifier as an encrypted identifier as described above. The base amount of payment confirmed by the user is the amount of the payment corresponding to the encoded image, and the extra amount is any additional funds added to the base amount, such as a tip amount.

Server Tries to Charge Payor Account, Waits for Payment Approval.

The payment confirmation and encrypted alternate user identifier is received at the server, an attempt is made to charge the payor account corresponding to the payment confirmation, and the server may wait for payment approval or confirmation 272. In one embodiment, the encrypted alternate user identifier may be decrypted at the server to identify the payor account corresponding to the payment confirmation. The linked financial account corresponding to the payor account is also identified, and the attempt to charge the linked financial account is made, such as by attempting to withdraw funds from a linked bank account, or charge payment to a linked credit card.

If multiple payor accounts are linked to the user account, the user may be prompted to select one or more as part of step 266 and identifiers of the selected one or more accounts are provided to the server as part of step 270. The server will attempt to charge the specified one or more accounts as specified by the user.

If Payment not Approved, then Deny Transaction, Notify Both Parties.

If the server does not receive confirmation that the payment is approved 274, then the transaction is denied, and both parties may be notified that the transaction is denied 276. In one embodiment, notification that the transaction is denied may be sent from the server to one or more devices or applications corresponding to the payor account and the payee account. The method may continue at step 220 or 222.

If Payment Approved, then Approve Transaction, Notify Payor and Payee, and Credit Payee Account Less Fee.

If the server receives confirmation that the payment is approved 274, then the transaction is approved, the account of the user or users are charged in the amounts specified, the effected parties are notified of the approved transaction, and the approved payment amount or amounts may be credited to the payee account minus any fees 278.

If Total Amount not Paid, then Indicate to Payors and Payee, Percent Paid Until Fully Paid.

If the total base amount owed corresponding to the transaction has not been paid 280, then an indication may be provided to the payor(s) and the payee 282. The method continues at step 220 or 222. In one embodiment, the amount or percentage of funds that have been paid by each payor account corresponding to the transaction may be provided to the payor and payee parties, or the total amount of funds paid corresponding to the transaction may be provided, or the total amount of funds still owed and not paid corresponding to the transaction may be provided, and/or any other information corresponding to the payment amount may be provided. In one embodiment, the user may be permitted to modify the amount or percentage of funds to pay corresponding to the transaction until the full amount of the total amount owed is paid, and any other payor users providing any amount of payment for the same transaction may also be given the same permission. To permit the user to modify the amount or percentage of funds to pay corresponding to the transaction until the full amount of the total amount due is paid, the method may continue at step 260.

If Total Amount Paid, then Mark Transaction Identifier as Paid.

If the total base amount owed corresponding to the transaction has been paid 280, then the server may mark 284 the transaction as having been paid along with the date and time of when the transaction was paid.

System.

FIG. 3 is a block schematic diagram of a system for using encoded images to provide and receive payments according to one embodiment of the present invention.

FIG. 4 is a block schematic diagram of server system 320 of FIG. 3 shown in more detail according to one embodiment of the present invention.

Figure 5:
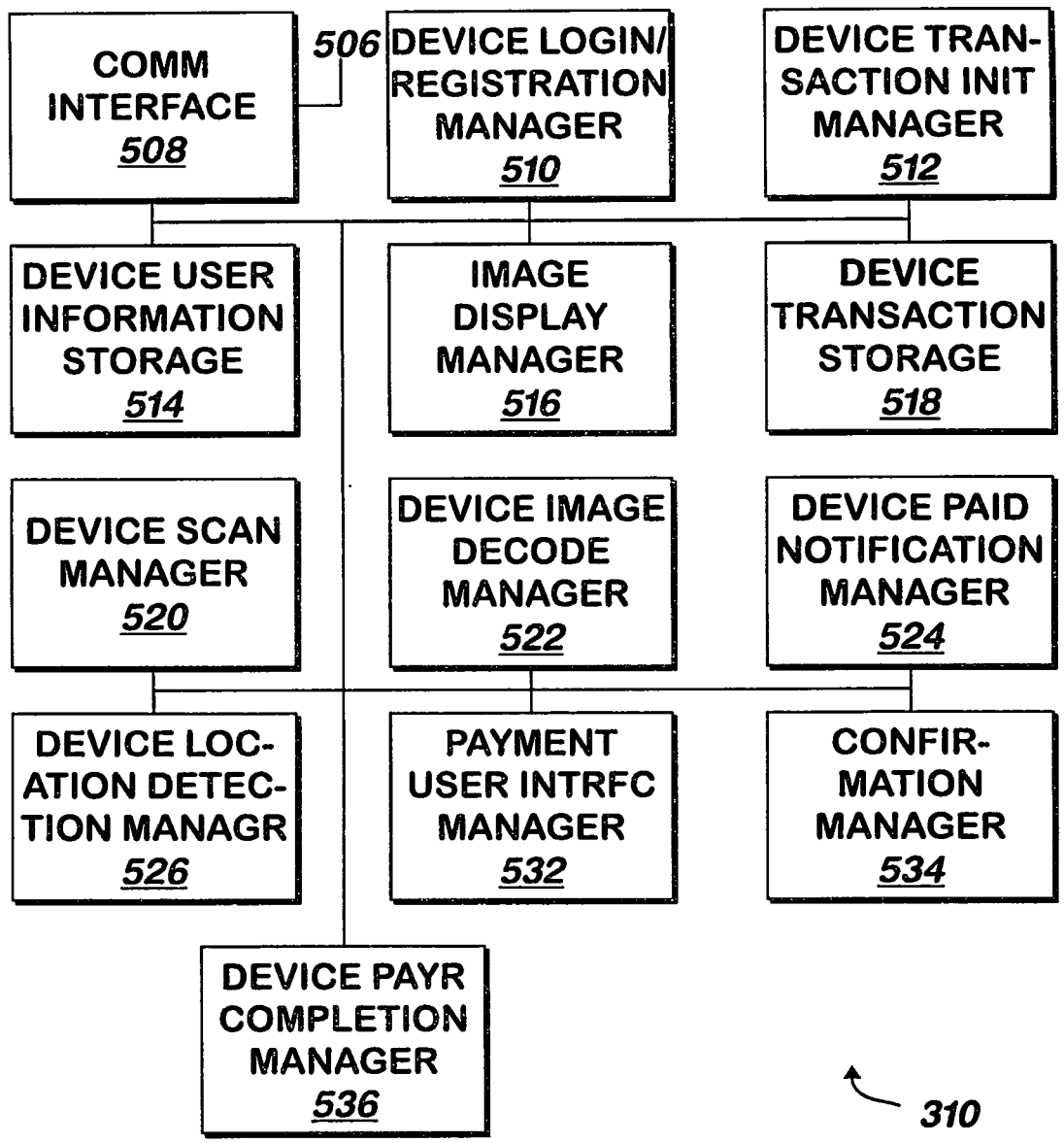
FIG. 5 is a block schematic diagram of user devices 310 of FIG. 3 shown in more detail according to one embodiment of the present invention.

FIG. 5 is a block schematic diagram of user devices 310 of FIG. 3 shown in more detail according to one embodiment of the present invention.

Referring now to FIGS. 3, 4, and 5, the system of FIG. 3 contains any number of user devices 310 and a server system 320, though other arrangements may be used. User devices 310 and server system 320 operate as described herein and include a respective communication interface 406 and 508, coupled to network 330, which may include a conventional communication interface running suitable communication protocols, such as Ethernet, TCP/IP or both. In one embodiment, unless otherwise noted herein, all communications in and out of the user devices 310 and server system 320 are made via input/output 404 of communication interface 508 and input/output 404 of communication interface 508, respectively, and all systems communicate via network 340, which may include a conventional Ethernet network, the Internet or both.

A user downloads a mobile application via download manager 408 using user device 310, which may include a conventional wireless communication device, such as a cell phone, with a conventional browser or application download manager such as an "app store" or "market" coupled to the Internet using suitable communications techniques. The user may download the application in any conventional manner via download manager 408, such as by purchasing and/or selecting the application at an online mobile application store.

The user registers with server system 320 using the user device 310, or using another device, such as a personal computer. In one embodiment, device log in/registration manager 520 provides a user interface, including one or more links to indicate one or more actions, such as a link to register or log in. Web pages may be described herein for certain actions, however, such actions may be performed via an application on the user device 310.

In one embodiment, device log in/registration manager 510 provides suitable user interface elements on the user device 310 to allow the user to provide registration information, including a payee/payor indication for each account the user is registering, linked financial account information for each account, and a user identifier and password, as described above. The user provides such information, and device log in/registration manager 510 receives it and forwards it to server log in/registration manager 410. In one embodiment, the user may log in to the server system 320 using another device, such as a personal computer including a web browser, and provide registration information directly to server log in/registration manager 410 via a suitable user interface, such as a web page, that server log in/registration manager 410 provides.

Server log in/registration manager 410 receives the registration information described above, either via device log in/registration manager 510 or more directly from the user, and stores the registration information in server user information storage 414 associated with the user identifier. All storage elements described herein such as server user information storage 414 may include conventional memory and/or disk storage and may include a conventional database. Server log in/registration manager 410 also issues an alternate user identifier for the user which is different than the user identifier, stores it into user information storage 414 associated with the other information received from the user, and sends the alternate user identifier to device log in/registration manager 410 at the user device 310 from which it received the registration information. Device log in/registration manager 510 receives the alternate user identifier and stores the alternate user identifier in device user information storage 514. Server log in/registration manager 410 may receive registration information from any number of users at any time, and when server log in/registration manager 410 has received financial account information corresponding to any financial account to link to the user's account or accounts, it marks them as unvalidated and server log in/registration manager 410 may signal validation manager 412 to validate the linked financial account information, as described above.

Additionally, for any payee account that the user is registering, the user may optionally provide, as part of the registration information, business information, including the name and address of the business to link to the payee account, as described above. For example, if the user is registering a payee account linked to the user's coffee shop, the user may provide the name of the coffee shop and the location or street address of the coffee shop as business information. Server log in/registration manager 410 receives business information provided by the user, in one embodiment, via device log in/registration manager 510, and server log in/registration manager 510 stores business information in server user information storage 414 associated with the user identifier.

Validation manager 412 receives the signal from server log in/registration manager 410, and validation manager 412 attempts to validate the user's unvalidated linked financial account(s). To validate the financial account information linked to the user's payee account as described above, validation manager 412 may deposit one or more amounts of funds into the specified account, such as the user's bank account, and records each deposited amount in server transaction storage 418 associated with the user's user identifier. To perform such functions, validation manager 412 may retrieve registration information, including the linked financial account information described above, from server user information storage 414.

In one embodiment, device log in/registration manager 510 provides suitable user interface elements to allow the user to provide the amount or amounts of funds deposited into the user's financial account. The user provides the amount(s) as described above, server log in/registration manager 410 receives the amount(s) (in one embodiment, via device log in/registration manager 510 if the user is using the user device 310), and checks whether the amount(s) provided by the user match the amount(s) stored in server transaction storage 418 associated with the user's user identifier.

If all of the deposit amount(s) received from the user do not match all of the deposited amount(s) stored in server transaction storage 418, then server log in/registration manager 410 retains the default indication in server user information storage 414 that the payee account is not validated, such as by marking the account as not validated or by not marking the account as validated, and notifies the user, as described above, that validation of the user's linked financial account information has not been successful, and the method continues at step 214. In one embodiment, server log in/registration manager 410 or other elements described herein may disallow any activity using the not validated payee account other than the process of validating the linked financial account information as described above.

If all of the deposit amount(s) received from the user match all of the deposited amount(s) stored associated with the user's user identifier in server transaction storage 418, then server log in/registration manager 410 marks the linked financial account as validated or otherwise stores an indication in server user information storage 414 that the financial account has been validated. Such accounts may be used as described herein.

In one embodiment, server log in/registration manager 410 receives business information from the user associated with the user's payee account, as described above, then server log in/registration manager 410 may also validate the user's business information, including the name and location of the business, using a business location database. The business location database may be stored and/or updated in business location database storage 424, such as by a system administrator, at any time.

Once any of a user's payee accounts is marked as validated in server user information storage 414, then the user may use the payee account to generate encoded images including quick-response or QR codes as described above. The user may request to generate an encoded image, such as by pressing a generate image button on the user interface provided by device log in/registration manager 510. Device transaction initiation manager 512 receives the indication from the user via log in/registration manager 510 and provides suitable user interface elements to allow the user to provide image transaction details, including the base amount of the transaction, an indication whether the encoded image is for one time use or reusable, an indication whether additional funds can be added to the base amount of the transaction, an indication whether the amount of the transaction may be paid using more than one payor account, any payee-provided transaction details to provide to the payee and/or the payor when the transaction is completed, and any other information. The user provides such information and device transaction initiation manager 520 forwards the image transaction details to server transaction initiation manager 416, along with the user's encrypted alternate user identifier, as described above. In one embodiment, device transaction initiation manager 520 may receive and forward the image transaction details along with the user's encrypted alternate user identifier stored on the user's device to server transaction initiation manager 416, or the user may log in to the server system 320, such as by using a personal computer, and server transaction initiation manager 416 may provide the user interface for the user to provide, and server transaction initiation manager 416 to receive, the image transaction details, as described above.

When server transaction initiation manager 416 receives the image transaction details, it generates a transaction identifier for the requested encoded image as described above and stores the transaction identifier in server transaction storage 418 associated with the payee user identifier, along with the base amount of the transaction, one-time use indication, multiple payor allowed indication, extra amount allowed indication, and any other image transaction details received, as described above. In one embodiment, if server transaction initiation manager 416 receives the image transaction details via device transaction initiation manager 512, then server transaction initiation manager 410 may decrypt the user's alternate user identifier and translate it to its corresponding user identifier in server user information storage 414 as described above.

In one embodiment, a third party server 340 may receive the image transaction details, and the third party server 340 may generate the transaction identifier within a range reserved by the server for that party and send the generated transaction identifier to server transaction initiation manager 416 along with the payee user identifier (or an alternate user identifier), the transaction amount, and other transaction information, as described above.

Server transaction initiation manager 416 generates the requested encoded image and sends the generated image to device transaction initiation manager 512, or server transaction initiation manager 416 sends image information to device transaction initiation manager 512, and device transaction initiation manager 512 generates the encoded image, encoding in the image the transaction identifier, transaction amount, and any other transaction information as described above. When device transaction initiation manager 512 has received the encoded image, or generated the encoded image, it stores the encoded image in device transaction storage 518 associated with the transaction identifier and signals image display manager 516.

When signaled, image display manager 516 may display the generated encoded image in any conventional manner. Image display manager 516 may display the generated encoded image on the user device 310, or on any other display or advertisement or other article in any manner as described above, or a system administrator or the user may display the generated image in any other manner, such as by printing the image and displaying it as described above.

Once the encoded image has been displayed, a payor user may log in to the server system 320 via device log in/registration manager 510 using the user device 310 and the user's previously established password as described above. In one embodiment, device log in/registration manager 510 provides suitable user interface elements to allow the user to provide the user's password, as described above. The user provides the password, and device log in/registration manager 510 receives the password, encrypts the password and alternate user identifier stored in device user information storage 514, and sends the encrypted password and alternate user identifier to server log in/registration manager 510.

Server log in/registration manager 410 receives the encrypted password and alternate user identifier from device log in/registration manager 510, decrypts the received information, and identifies the user identifier and password corresponding to the decrypted alternate user identifier in server user information storage 414. If the decrypted password matches the password stored in server user information storage 414, then the user and the user device 310 are authenticated.

The authenticated user may request to make a payment using the user's device via the user's payor account, such as by selecting a pay by code option on the user interface provided by device log in/registration manager 510. When the user selects such an option on the user device 310, device scan manager 520 receives the request and provide suitable user interface elements to allow the user to scan an encoded image, such as one generated using a payee account in the manner described above, with a camera on the user's user device 310. In one embodiment, device scan manager 520 may scan the encoded image, store the scanned image in device transaction storage 518 along with the date and time of when the image was scanned, and send the image to device image decode manager 522.

Device image decode manager 522 receives the encoded image, decodes image details from the encoded image using conventional image decoding techniques, such as conventional bar code or QR code decoding techniques, and in one embodiment, sends the decoded transaction identifier to server paid check manager 420 along with the alternate user identifier stored on the user's user device 310. In one embodiment, device image decode manager 522 sends the encoded image and the alternate user identifier to server paid check manager 420, and server paid check manager 420 decodes image details, including the transaction identifier, from the encoded image as described above.

Server paid check manager 420 identifies whether the encoded image has been generated for one-time use or is reusable, and also determines if the encoded image has been previously used to pay the amount corresponding to the image, in full, as described above. In one embodiment, server paid check manager 420 checks the one-time use indication and the paid indication stored in server transaction storage 414 associated with the transaction identifier decoded from the image. If server paid check manager 420 determines that the image has been generated for one-time use and has been used previously to make a payment, then it signals device paid notification manager 524 that the one-time use image has already been paid. Device paid notification manager 524 receives such an indication and notifies the user on the user device 310 scanning the image that the encoded image has already been paid as described above.

If server paid check manager 420 determines that the image has not been generated for one-time use, or that the image has been generated for one-time use and has not been paid, as described above, server paid check manager 420 signals device image decode manager 522 that the image has not expired as described above.

In one embodiment, such determination notification may be made at the time payment is submitted instead of doing it in advance. In such embodiment, device image decode manager 526 signals device location detection manager 526 unconditionally.

Device image decode manager 522 receives the signal from server paid check manager 420 and signals device location detection manager 526 to verify location information corresponding to the image.

Device location detection manager 526 receives the signal from device image decode manager 522 and device location detection manager 526 may send the location (or last known location) of the user device 310 scanning the encoded image to server location check manager 422. In one embodiment, device location detection manager 526 reads conventional location coordinates (i.e. latitude, longitude) from a conventional GPS receiver (not shown) of user device 310 at intervals or at any time, and device location detection manager 526 may send such location coordinates to server location check manager 422 along with the transaction identifier and alternate user identifier.

Server location check manager 422 receives the location information, transaction identifier and alternate user identifier from device location detection manager 526 and may determine whether the location information received matches business location information stored associated with the payee user identifier in server user information storage 414. In one embodiment, server location check manager 422 identifies the payee user identifier associated with the received transaction identifier in server transaction storage 418.

If business location information corresponding to the payee user identifier is marked as verified, server location check manager 422 may check the business location database in business location database storage 424 to verify that the business associated with the payee user identifier is still currently located at the verified business location address, and if so, server location check manager 422 compare the received location information of the user device 310 scanning the image with the verified business location information to determine if the user device 310 is within a threshold distance from the verified business location, as described above. If the device is within the threshold distance from the verified business location, server location check manager 422 signals device location detection manager 526 with the transaction identifier that location information corresponding to the transaction identifier is verified.

If no business location information has been stored in association with the payee user identifier in server user information storage 414, or if business location information has been stored associated with the payee user identifier in server user information storage 414 but not verified as described above, or if the received location coordinates of the user device 310 scanning the encoded image are not within the threshold distance from the verified business location information corresponding to the payee user identifier, then server location check manager 422 may signal device location detection manager 526 to notify the user that the business location information corresponding to the scanned image is not verified as described above. Server location check manager 422 may signal device location detection manager 526 with the transaction identifier.

Device location detection manager 526 may receive the signal and transaction identifier, notify the user that business location information corresponding to the scanned image is not verified, and provide suitable user interface elements to allow the user to override the location notification as described above, such as by providing and/or displaying an override button on the user device 310.

If the user selects the override option, such as by clicking the override button, or if device location detection manager 526 receives the signal from server location check manager 422 that location information is verified, as described above, device location detection manager 526 signals device image decode manager 522 that location information corresponding to the scanned image is verified.

When device image decode manager 522 receives the signal that location information corresponding to the scanned image is verified (or overridden by the user), it may signal payment user interface manager 532 to display and/or receive any payment details. In one embodiment, the location verification is not used, and image decode manager 522 signals payment user interface manager 532 unconditionally. In one embodiment, when signaled, device image decode manager 522 builds a payment object, including the transaction identifier and any image transaction details decoded from the image, and send the payment object to payment user interface manager 532. In one embodiment, device decode manager 522 may decode the base amount from the encoded image, or device image decode manager 522 may receive the decoded base amount from server transaction information provider 430. As described herein, any information decoded and/or displayed on the user device 310 may be decoded by the user device 310, or it may be decoded by the server system 320 and sent to the user device 310.

Payment user interface manager 532 receives the signal and payment object from device image decode manager 522 and displays the base amount included in the payment object, along with any payor information and the name of the payee, such as that provided by the payee previously when requesting the encoded image above.

Payment user interface manager 532 displays the base amount, and checks the multiple payors allowed indication and extra amount allowed indication included in the payment object. If the multiple payors allowed indication decoded from the image is marked as allowed, payment user interface manager 532 displays a suitable user interface to allow the user to provide the amount or percentage of the displayed base amount that the user would like to pay with the user's payor account. The user provides such information and payment user interface manager 532 receives it and adds it to the payment object. When payment user interface manager 532 has added the amount or percentage that the user would like to pay to the payment object, or if the multiple payors allowed indication associated with the payment object is marked as not allowed, then payment user interface manager 532 checks the extra amount allowed indication in the payment object.

If the extra amount allowed indication associated with the payment object is marked as allowed, then payment user interface manager 532 displays a suitable user interface to allow the user to provide the extra amount or percentage in addition to the base amount that the user would like to pay, as described above. The user provides the extra amount information, and payment user interface manager 532 receives it and adds it to the payment object. When payment user interface manager 532 has received and stored the extra amount information, or if the extra amount indication included in the payment object is marked as not allowed, then payment user interface manager 532 sends the payment object to confirmation manager 534, which receives the payment object and displays the total amount being paid by the user along with a confirmation button. In one embodiment, confirmation manager 534 displays the total amount paid by the user, including the amount of the base amount being paid by the user plus any extra amount added by the user as described above.

If the user confirms the displayed total amount being paid, such as by pressing the confirmation button, then confirmation manager 534 receives the confirmation and sends the transaction identifier, confirmed base amount being paid by the user, confirmed extra amount being paid by the user, and the user's alternate user identifier to server transaction manager 440.

If the user registered multiple validated payor accounts, confirmation manager 534 displays a user interface allowing the user to see the validated accounts and select one or more of them to use for payment, receives the user's selection, and includes an identifier of such account or accounts with the information supplied to server transaction manager 440.

Server transaction manager 440 receives the transaction identifier, base amount being paid, extra amount being paid, and the alternate user identifier, and optionally, identifiers of one or more accounts, and server transaction manager 440 stores such information in server transaction storage 418 associated with the payment serial number. In one embodiment, server transaction manager 440 translates the received alternate user identifier to its corresponding user identifier, and stores the information above with the user identifier. Server transaction manager 440 sends the payment serial number, transaction identifier, total amount paid (base amount plus any extra amount), the user identifier corresponding to the received alternate user identifier, and optionally identifiers of the accounts received to server payment manager 442, and optionally identifiers of the accounts received which receives the information and attempts to charge the payor account corresponding to the user identifier and optionally to the account identifiers received in server user information storage 414. In one embodiment, server payment manager 442 identifies the financial account information corresponding to the financial account (e.g. bank account or credit card) linked to the user's payor account in server user information storage 414, and server payment manager 442 waits for confirmation or approval of the payment from the linked financial account.

If payment is not approved at the linked financial account, then server payment manager 442 may deny the transaction and signal device payment completion manager 536 that the payment was not approved. Server payment manage 442 may also signal device payment completion manager 536 corresponding to the payee user's device that the payment was not approved.

Device payment completion manager 536 (corresponding to both the payor and the payee accounts) may receive the notification that payment was not approved and display such notification on the user device 310 or the user's personal computer, or notify the user in any other manner.

If server payment manager 442 receives confirmation that the payment is approved at the financial account linked to the payor account as described above, server payment manager 442 approves the transaction as described above, and notifies device payment completion manager 536 corresponding to the transaction that the transaction is approved, and credits the payee's account at the financial institution, registered as described above, in the amount of the transaction minus any fees, as described above. In one embodiment, server payment manager 442 sends notification of the approved payment, including the amount of the approved transaction and the amount or percentage of the full amount of the image transaction that has been paid and/or the amount that must still be paid in order for the full amount to be paid (in which case each payment received for a transaction causes server payment manager 442 to send another set of such notifications for such transaction), to device payment completion manager 536 corresponding to the payee account (for example, if the payee is displaying the encoded image on a handset), as well as each payor account paying any portion of the total payment until the full base amount of the encoded transaction is paid, as described above.

When server payment manager 442 has received and approved the full base amount of the encoded transaction, server payment manager 442 marks the transaction as paid in server transaction storage 414 and stores the date and time of when the transaction was completed in server transaction storage 414.

In one embodiment, if the amount of the image transaction equals or exceeds the amount of the transaction supplied by the payee, the payee will provide goods or services or consider goods and services paid for.

Different payors may make different payments to different payees, and each payee may receive payments that are the same amount from different payors or that are different amounts from different payors. The identity and account information of the payor is not disclosed to the payee in one embodiment, though the transaction is identified. A payor may use the system to make a payment to a payee at one time, and then make a payment to the same payee at a different time in the same or a different amount each time. The elements of server system 320 may receive the different payments from the same or different user payors for the same or different transactions or amounts and process them as described above.

The image may be generated by the payee before the information for the transaction corresponding to the image is received at the server.

As noted above, the image need not be generated by transaction initiation manager 416. In one embodiment, the image is generated by third party server 340 or the user device 310 of the payee, or any device operated for the payee and/or not operated by an entity for which server system 320 is operated. Thus, transaction initiation manger 416 or third party server or user device may serve as an image generator.

Server system 320 and third party server 340 may include conventional server computer systems, and user devices 310 may include conventional smart phones, point of sale terminals or personal computer systems. Storage elements 414, 418 may include conventional memory or disk storage and may include a conventional database.

The image may be provided to any tangible article, such as a display screen on a user device 310 or one coupled to the third party server 340, or a paper article such as a conventional hang tag or piece of paper.

Summary.

A method of a payor making a payment to a payee without disclosing an identity of the payor to the payee, is described, the method containing steps including: receiving from a payee device over a network at a server computer system, information about the payment comprising an amount; generating an image encoded with at least some of the information about the payment; receiving information corresponding to the image at the server computer system via the network from a device of the payor; and initiating by the server computer system, a payment from the payor to the payee responsive to the information received at the server computer system from the payor.

The method may include a feature whereby the image is generated by a device other than the server computer system. The method may include a feature whereby the image is generated before the information about the payment is received at the server computer system.

The method may contain the additional steps of receiving information corresponding to the image at the server computer system via the network from a device of a different payor; and initiating by the server computer system, a payment from the different payor to the payee responsive to the information received at the server computer system from the different payor. The method may include a feature whereby the payment by the payor and the payment by the different payor are for a single transaction between the payee on one hand, and the payor and different payor on another hand.

The method may include features whereby the information corresponding to the image received from the device of the payor specifies a first amount that is a portion of the amount; the information corresponding to the image received from the device of the different payor specifies a second amount that is a portion of the amount; and the payee is notified by the server responsive to a sum of the first amount and the second amount.

A system for a payor to make a payment to a payee without disclosing an identity of the payor to the payee is described, the system including: a transaction initiation manager having an input coupled for receiving from a payee device over a network, information about the payment comprising an amount, the transaction initiation manager for providing said information about the payment to a digital storage device; an image generator having an input coupled for receiving at least some of the information about the payment, the image generator for generating and providing at an output to a tangible article an image encoded with at least some of the information about the payment received; a server transaction manager having an input coupled for receiving information corresponding to the image via the network from a device of the payor, the server paid check manager for providing at an output at least some the information corresponding to the image received at the server paid check manager input; and a server payment manager having an input coupled to the server paid check manager for receiving the at least some of the information corresponding to the image, the server payment manager for initiating via an output, a payment from the payor to the payee responsive to the at least some of the information corresponding to the image received at the server payment manager input. The system may contain a feature whereby the image is generated by a device operated by the payee.

The system may contain a feature whereby the image is generated before the information about the payment is received at the transaction initiation manager.

The system may contain features whereby: the server transaction manager input is additionally for receiving information corresponding to the image at the server computer system via the network from a device of a different payor and the server transaction manager is additionally for providing at the server transaction manager output at least some the information corresponding to the image received at the server paid check manager input from the different payor; and the server payment manager input is additionally for receiving the at least some the information corresponding to the image received at the server paid check manager input from the different payor, and the server payment manager is additionally for initiating via the server payment manager output, a payment from the different payor to the payee responsive to the at least some the information corresponding to the image received at the server paid check manager input from the different payor received at the server payment manager input.

The system may contain a feature whereby the payment by the payor and the payment by the different payor are for a single transaction between the payee on one hand, and the payor and different payor on another hand.

The system may contain features whereby: the information corresponding to the image received from the device of the payor specifies a first amount that is a portion of the amount; the information corresponding to the image received from the device of the different payor specifies a second amount that is a portion of the amount; and the server payment manager is additionally for notifying the payee responsive to a sum of the first amount and the second amount.

A computer program product comprising a computer useable medium having computer readable program code embodied therein for facilitating a payor making a payment to a payee without disclosing an identity of the payor to the payee is described, the computer program product including computer readable program code devices configured to cause a computer system to: receive from a payee device over a network at a server computer system, information about the payment comprising an amount; generate an image encoded with at least some of the information about the payment; receive information corresponding to the image at the server computer system via the network from a device of the payor; and initiate by the server computer system, a payment from the payor to the payee responsive to the information received at the server computer system from the payor.

The computer program product may contain a feature whereby the computer readable program code devices configured to cause the computer system to generate the image, generate the image on a device other than the server computer system.

The computer program product may contain a feature whereby the image is generated before the information about the payment is received at the server computer system.

The computer program product may additionally include computer readable program code devices configured to cause the computer system to: receive information corresponding to the image at the server computer system via the network from a device of a different payor; and initiate by the server computer system, a payment from the different payor to the payee responsive to the information received at the server computer system from the different payor.

The computer program product may contain a feature whereby the payment by the payor and the payment by the different payor are for a single transaction between the payee on one hand, and the payor and different payor on another hand (i.e. the payor and different payor together pay the payee for the same transaction).

The computer program product may contain a feature whereby: the information corresponding to the image received from the device of the payor specifies a first amount that is a portion of the amount; and the information corresponding to the image received from the device of the different payor specifies a second amount that is a portion of the amount; and the computer program product may additionally contain computer readable program code devices configured to cause the computer system to notify the payee responsive to a sum of the first amount and the second amount.

What is claimed is:

1. A method of providing payment for a transaction to a payee without disclosing to the payee an identity of payors of the transaction, the payment including at least a base payment, comprising:

receiving, at a server computer system, registration information for one or more of a first one of the payors and the payee, the registration information including an application user identifier for a respective one of the payee and the first one of the payors;

issuing, by the server computer system, an alternative user identifier for the first one of the payors and storing an association between the alternative user identifier of the first one of the payors and the registration information of the first one of the payor;

receiving, at the server computer system, information from a payee device over a network, the information including an amount of the base payment and a transaction identifier identifying the transaction, the information being encoded into an image into an image by the payee or payor device;

storing, by the server computer system, the transaction identifier such that the transaction identifier is associated with the transaction;

at a first time, receiving, at the server computer system, information corresponding to the image via the network from a mobile device of the first one of the payors, the information including an encoded version of the alternative user identifier for the first one of the payors, the transaction identifier extracted by scanning the image via a camera included in the mobile device and a first payment amount such that the first payment amount includes at least a share of the base payment attributed to the first one of the payors;

authenticating, by the server computer system, the first one of the payors based on the alternative user identifier provided to the server computer system in response to the mobile device of the first one of the payors scanning the image and the association between the alternative user identifier and the registration information;

transferring the first payment amount from the first one of the payors to the payee in response to authenticating the first one of the payors based on the alternative user identifier; and at a second time, different from the first time, determining if the base payment for the transaction has been collected in full from the payors, and marking the transaction identifier associated with the transaction as paid in response to the base payment for the transaction having been collected in full from the payors.

2. The method of claim 1, wherein the image is generated by a device operated by the payee.

3. The method of claim 1, wherein the image is generated before the information about the payment is received at the server computer system.

4. The method of claim 1, further comprising:

providing, via the server computer system, an indication to the payors of a remaining portion of the base payment, in response to the base payment for the transaction not being collected in full from the payors, receiving, at the server computer system, information corresponding to the image at via the network from a mobile device of a second one of the payors, the information including at least the transaction identifier and a second payment amount such that the second payment amount includes at least a share of the base payment attributed to the second one of the payors, and transferring the second payment amount from the second one of the payors to the payee.

5. The method of claim 4, wherein the first payment amount and the second payment amount includes the share of the base payment attributed to the first one of the payors and the second one of the payors, respectively, and additional amounts attributed thereto, and the providing provides the indication to the payors of the remaining portion of the base payment while separately maintaining a tally of the additional amount.

6. A server configured to provide payment for a transaction to a payee without disclosing to the payee an identity of payors of the transaction, the payment including at least a base payment, the server comprising:

a memory and processing circuitry, the memory storing computer readable code that, when executed by the processing circuitry, configures the server to, receive registration information for one or more of a first one of the payors and the payee, the registration information including an application user identifier for a respective one of the payee and the first one of the payors, issue an alternative user identifier for the first one of the payors and storing an association between the alternative user identifier of the first one of the payors and the registration information of the first one of the payor, receive, from a payee device over a network, information including an amount of the base payment and a transaction identifier identifying the transaction, the information being encoded into an image by the payee or payor device;

store the transaction identifier such that the transaction identifier is associated with the transaction;

at a first time, receive information corresponding to the image via the network from a mobile device of the first one of the payors the information including at least an encoded version of the alternative user identifier for the first one of the payors, the transaction identifier extracted by scanning the image via a camera included in the mobile device and a first payment amount such that the first payment amount includes at least a share of the base payment attributed to the first one of the payors, authenticate the first one of the payors based on the alternative user identifier provided to the server in response to the mobile device of the first one of the payors scanning the image and the association between the alternative user identifier and the registration information, transfer the first payment amount from the first one of the payors to the payee in response to authenticating the first one of the payors based on the alternative user identifier; and at a second time, different from the first time, determine if the base payment for the transaction has been collected in full from the payors, and mark the transaction identifier associated with the transaction as paid in response to the base payment for the transaction having been collected in full from the payors.

7. The server of claim 6, wherein the image is generated by a device operated by the payee.

8. The server of claim 6, wherein the image is generated before the information about the payment is received by the server.

9. The server of claim 6, wherein the server is further configured to, provide an indication to the payors of a remaining portion of the base payment, in response to the base payment for the transaction not being collected in full from the payors, receive information corresponding to the image via the network from a mobile device of a second one of the payors, the information including at least the transaction identifier and a second payment amount such that the second payment amount includes at least a share of the base payment attributed to the second one of the payors, and transfer the second payment amount from the second one of the payors to the payee.

10. The server of claim 9, wherein the first payment amount and the second payment amount includes the share of the base payment attributed to the first one of the payors and the second one of the payors, respectively, and additional amounts attributed thereto, and the server provides the indication to the payors of the remaining portion of the base payment while separately maintaining a tally of the additional amount.

11. A non-transitory computer readable medium having computer readable program code embodied therein that, when executed by a server, configures the server to provide at least a base payment included in a payment for a transaction to a payee without disclosing to the payee an identity of payors of the transaction by:

receiving registration information for one or more of a first one of the payors and the payee, the registration information including an application user identifier for a respective one of the payee and the first one of the payors;

issuing an alternative user identifier for the first one of the payors and storing an association between the alternative user identifier of the first one of the payors and the registration information of the first one of the payor;

receiving information from a payee device over a network, the information including an amount of the base payment and a transaction identifier identifying the transaction, the information being encoded into an image by the payee or payor device;

storing the transaction identifier such that the transaction identifier is associated with the transaction;

at a first time, receiving information corresponding to the image via the network from a mobile device of the first one of the payors, the information including at least an encoded version of the alternative user identifier for the first one of the payors, the transaction identifier extracted by scanning the image via a camera included in the mobile device and a first payment amount such that the first payment amount includes at least a share of the base payment attributed to the first one of the payors;

authenticating the first one of the payors based on the alternative user identifier provided to the server in response to the mobile device of the first one of the payors scanning the image and the association between the alternative user identifier and the registration information;

transferring the first payment amount from the first one of the payors to the payee in response to authenticating the first one of the payors based on the alternative user identifier; and at a second time, different from the first time, determining if the base payment for the transaction has been collected in full from the payors, and marking the transaction identifier associated with the transaction as paid in response to the base payment for the transaction having been collected in full from the payors.

12. The non-transitory computer readable medium of claim 11, wherein the image is generated on a device operated by the payee.

13. The non-transitory computer readable medium of claim 11, wherein the image is generated before the information about the payment is received at the server.

14. The non-transitory computer readable medium of claim 11, wherein the computer readable program code, when executed by the server, further configures the server to, provide an indication to the payors of a remaining portion of the base payment, in response to the base payment for the transaction not being collected in full from the payors, receive information corresponding to the image via the network from a mobile device of a second one of the payors, the information including at least the transaction identifier and a second payment amount such that the second payment amount includes at least a share of the base payment attributed to the second one of the payors, and transfer the second payment amount from the second one of the payors to the payee.

15. The non-transitory computer readable medium of claim 14, wherein the first payment amount and the second payment amount includes the share of the base payment attributed to the first one of the payors and the second one of the payors, respectively, and additional amounts attributed thereto, and the server provides the indication to the payors of the remaining portion of the base payment while separately maintaining a tally of the additional amount.

16. The method of claim 1, wherein the alternative user identifier is storable in a mobile application on the mobile device of the first one of the payors while the application user identifier for the first one of the payors is not storable thereon.

17. The method of claim 1, further comprising:

generating, by the server computer system, the transaction identifier identifying the transaction, in response to receipt of a transaction request associated with the transaction from the payee; and associating the transaction identifier for the transaction and the application user identifier for the payee.

18. The server of claim 6, wherein the alternative user identifier is storable in a mobile application on the mobile device of the first one of the payors while the application user identifier for the first one of the payors is not storable thereon.

19. The server of claim 6, wherein the computer readable code, when executed by the processing circuitry, further configures the server to, generate the transaction identifier identifying the transaction, in response to receipt of a transaction request associated with the transaction from the payee, and associate the transaction identifier for the transaction and the application user identifier for the payee.

20. The non-transitory computer readable medium of claim 11, wherein the alternative user identifier is storable in a mobile application on the mobile device of the first one of the payors while the application user identifier for the first one of the payors is not storable thereon.

21. The non-transitory computer readable medium of claim 11, wherein the computer readable program code, when executed by the server, further configures the server to, generate the transaction identifier identifying the transaction, in response to receipt of a transaction request associated with the transaction from the payee, and associate the transaction identifier for the transaction and the application user identifier for the payee.

\* \* \* \* \*